US 11,113,832 B2

(12) United States Patent
Wadhwa et al.

(10) Patent No.: US 11,113,832 B2
(45) Date of Patent: Sep. 7, 2021

(54) APERTURE SUPERVISION FOR SINGLE-VIEW DEPTH PREDICTION

(71) Applicant: Google LLC, Mountain View, CA (US)

(72) Inventors: Neal Wadhwa, Mountain View, CA (US); Jonathan Barron, Mountain View, CA (US); Rahul Garg, Mountain View, CA (US); Pratul Srinivasan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/759,808

(22) PCT Filed: Nov. 3, 2017

(86) PCT No.: PCT/US2017/059841
§ 371 (c)(1),
(2) Date: Apr. 28, 2020

(87) PCT Pub. No.: WO2019/089039
PCT Pub. Date: May 9, 2019

(65) Prior Publication Data
US 2021/0183089 A1 Jun. 17, 2021

(51) Int. Cl.
G06T 7/557 (2017.01)
G01S 11/12 (2006.01)
(Continued)

(52) U.S. Cl.
CPC .............. G06T 7/557 (2017.01); G01S 11/12 (2013.01); G06K 9/00664 (2013.01);
(Continued)

(58) Field of Classification Search
CPC . G06T 7/251; G06T 7/40; G06K 2009/00738; G06K 2209/21
See application file for complete search history.

(56) References Cited

U.S. PATENT DOCUMENTS 6,084,671 A * 7/2000 Holcomb ............. G01B 11/303
356/511
6,891,966 B2 * 5/2005 Chen .................... G06K 9/20
382/145
(Continued)

FOREIGN PATENT DOCUMENTS

WO WO2017/149370 9/2017

OTHER PUBLICATIONS

International Search Report for International Application No. PCT/US2017/059841 dated Jul. 18, 2018, 2 pages.

Primary Examiner — Yosef Kassa
(74) Attorney, Agent, or Firm — McDonnell Boehnen Hulbert & Berghoff LLP

(57) ABSTRACT

Example embodiments allow for training of artificial neural networks (ANNs) to generate depth maps based on images. The ANNs are trained based on a plurality of sets of images, where each set of images represents a single scene and the images in such a set of images differ with respect to image aperture and/or focal distance. An untrained ANN generates a depth map based on one or more images in a set of images. This depth map is used to generate, using the image(s) in the set, a predicted image that corresponds, with respect to image aperture and/or focal distance, to one of the images in the set. Differences between the predicted image and the corresponding image are used to update the ANN. ANNs trained in this manner are especially suited for generating depth maps used to perform simulated image blur on small-aperture images.

20 Claims, 8 Drawing Sheets

(51) Int. Cl.
*G06K 9/62* (2006.01)
*G06K 9/00* (2006.01)

(52) U.S. Cl.
CPC .. *G06K 9/6262* (2013.01); *G06T 2207/10052* (2013.01); *G06T 2207/20084* (2013.01)

(56) References Cited

U.S. PATENT DOCUMENTS

| | | | | |
|---|---|---|---|---|
| 7,746,469 | B2 * | 6/2010 | Shamir | G01N 15/1459 |
| | | | | 356/338 |
| 7,813,543 | B2 * | 10/2010 | Moden | G06T 7/30 |
| | | | | 382/154 |
| 8,587,670 | B2 * | 11/2013 | Wood | H04N 5/23245 |
| | | | | 348/207.99 |
| 2017/0069097 | A1 | 3/2017 | Molgaard et al. | |

* cited by examiner

APERTURE SUPERVISION FOR SINGLE-VIEW DEPTH PREDICTION

This application is a national stage application under 35 U.S.C. § 371 of International Application No. PCT/2017/059841, filed Nov. 3, 2017.

BACKGROUND

A variety of methods exist to determine a depth map for an image. Such a depth map may describe the depth of objects and/or regions within the image, e.g., a distance of such objects from a camera used to capture or generate the image. In some examples, a distance sensor (e.g., a radar, a lidar, an ultrasonic ranging system) could be used to provide information for determination of the depth map. In further examples, multiple related images (e.g., left and right images of a stereo image pair) could be used to determine the depth map.

SUMMARY

Depth maps can be determined from a single image via a variety of methods. This can include applying the single image to an artificial neural network (ANN) or other algorithms to generate the depth map, e.g., based on visual cues present within the image. The depth map can then be used to facilitate a variety of applications, e.g., navigation, applying distance-based blurring or other filtering to the source image, or other applications.

The ANN (or other algorithm) used to generate a depth map from a single image could be developed according to a variety of processes. The present disclosure provides methods for training an ANN based on sets of images of natural scenes. Each set of images includes two or more images of a common scene, taken at respective different apertures and/or focal lengths. A source image of the common scene (e.g., an all-in-focus image or some other image having large depth-of-field) is applied to the ANN to generate a predicted depth map. The predicted depth map is then used to generate, based on the source image, a predicted image that corresponds, with respect to focal length, aperture, or some other optical property, to another image (e.g., a target image) from the set of images of the common scene. The difference between the predicted image and the target image can then be used to train the ANN (e.g., by using the difference as an error signal to update the ANN via backpropagation).

Such an update process could be performed a plurality of times, and based on a plurality of sets of images, to generate an ANN. Such a trained ANN can then be used (e.g., by a processor of a cell phone) to determine depth maps from single images of natural scenes (e.g., images of humans, animals, plants, or other object in indoor or outdoor environments). The output of the ANN could be sparse or otherwise have a lower resolution than a target resolution e.g., a resolution matching the resolution of the input image(s)). In such examples, the output of the ANN could be upsampled to provide a higher-resolution depth map. Such upsampling could include using interpolation, a bilateral method, or some other method to generate a higher-resolution depth map. Using a bilateral method to upsample the depth map could include generating a higher-resolution depth map that corresponds to the depths represented in a lower-resolution depth map such that the higher-resolution depth map may exhibit sharp edges or other sharp features corresponding to object edges or other features within the input image(s).

Generating a predicted image can include applying an aperture rendering function to generate the predicted image by simulating the effect of a wider aperture, a different focal length, or some other change on the source image. For example, the aperture rendering function could operate to warp the source image to determine an estimate of the light field that resulted in the source image, and then to shear and project the estimated light field to generate the predicted image. The aperture rendering function could be differentiable, to facilitate backpropagation or other ANN training techniques.

In some embodiments, an ANN could be trained on a single set of images of a particular scene to generate a depth map for one (or more) of the images of the scene. For example, a set of shallow depth-of-field images of a scene having respective different focal lengths could be used, according to the methods of the present disclosure, to both train a depth-predicting ANN (e.g., an autoencoder network) and a depth map for the scene (e.g., for one of the set of images).

The methods disclosed herein allow a training set of images to be used to train a depth-predicting artificial neural network without requiring information about the "ground truth" of depths within images of the training set. Further, the images may be obtained without complicated multi-perspective setups (e.g., using stereo image pairs for training). Instead, images for such a training set may be obtained using a single image capture device observing scenes from a single viewpoint, e.g., by taking multiple images at different focal lengths and/or aperture settings, or by using a light field camera to capture information about a light field received from a scene. The methods therefore address problems associated with prior art techniques for training depth-predicting artificial neural networks that may require complicated multi-perspective setups and/or expensive, low-resolution depth sensing setups. The trained depth-predicting neural network may be used to generate depth information from a single image.

In a first aspect, a method includes: (i) obtaining a plurality of images, wherein a set of at least two images of the plurality of images describe a common scene, wherein the set of at least two images comprises a source image having a first depth-of-field and a target image having a second depth-of-field, wherein the second depth-of-field is less than the first depth-of-field; (ii) determining, using an artificial neural network, a depth map for the common scene based on the source image; (iii) determining, based on the determined depth map for the common scene, a predicted image based on the source image such that the predicted image has a depth-of-field corresponding to the second depth-of-field; (iv) determining a difference between the predicted image and the target image; (v) updating the artificial neural network based on the determined difference; (vi) obtaining an image of a scene of interest; and (vii) using the updated artificial neural network to generate a depth map for the scene of interest based on the image of the scene of interest.

The above aspect may comprise one or more of the following optional features. The step of determining, based on the first depth map, a predicted image based on the source image may comprise using a differentiable aperture rendering function. The step of using the differentiable aperture rendering function to determine the predicted image may comprise: determining an estimated light field based on the source image; and based on the first depth map, shearing and projecting the estimated light field to determine the predicted image. The step of determining, using the artificial neural network, the depth map for the common scene based on the source image may comprise: determining, using the artificial neural network, a set of depth values based on the source image, wherein each depth value of the set of depth values corresponds to a respective location within the source image; and upsampling the set of depth values to generate the depth map for the common scene. The step of upsampling the set of depth values to generate the depth map for the common scene may comprise using a bilateral method to upsample the set of depth values based on the source image. The target image may be a first target image. The predicted image may be a first predicted image. The determined difference may be a first determined difference. The set of at least two images may further comprise a second target image having a third depth-of-field, wherein the third depth-of-field differs from the second depth-of-field and is less than the first depth-of-field and the method may further comprise: determining, based on the determined depth map for the common scene, a second predicted image based on the source image such that the second predicted image has a depth-of-field corresponding to the third depth-of-field; and determining a second difference between the second predicted image and the second target image, wherein updating the artificial neural network comprises updating the neural network based on the second difference. The step of obtaining the set of at least two images that describe the common scene may comprise: capturing, using a light field camera, a light field from the common scene; generating the source image based on the captured light field such that the source image has the first depth-of-field; and generating the target image based on the captured light field such that the target image has the second depth-of-field. The step of obtaining the set of at least two images that describe the common scene may comprise: capturing, using a camera set to a first aperture setting, the source image; and capturing, using the camera set to a second aperture setting, the target image, wherein the second aperture setting is wider than the first aperture setting. The step of obtaining the image of the scene of interest may comprise operating a cell phone to capture the image of the scene of interest and the method may further comprise: transmitting, from a server to the cell phone, an indication of the updated artificial neural network, wherein using the updated artificial neural network to generate the depth map for the scene of interest based on the image of the scene of interest comprises a processor of the cell phone using the updated artificial neural network to generate the depth map for the scene of interest. The method may further comprise performing image processing on the image of the scene of interest based on the determined depth map for the scene of interest. The artificial neural network may be a convolutional neural network.

In a further aspect, a method includes: (i) obtaining, by a system, a plurality of images, wherein a set of at least two images of the plurality of images describe a common scene, wherein the set of at least two images comprises a source image having a first depth-of-field and a target image having a second depth-of-field, wherein the second depth-of-field is less than the first depth-of-field; (ii) determining, by the system using an artificial neural network, a depth map for the common scene based on the source image; (iii) determining, by the system based on the determined depth map for the common scene, a predicted image based on the source image such that the predicted image has a depth-of-field corresponding to the second depth-of-field; (iv) determining, by the system, a difference between the predicted image and the target image; (v) updating, by the system, the artificial neural network based on the determined difference; and (vi) transmitting, from the system to a remote device, an indication of the updated artificial neural network.

In yet another aspect, a method includes: (i) obtaining a plurality of images of a scene, wherein the images each have a shallow depth-of-field and differ with respect to focal distance; (ii) determining, using an artificial neural network, a depth map for the scene based on the plurality of images; (iii) determining, based on the plurality of images and the determined depth map for the scene, a predicted large depth-of-field image of the scene; (iv) determining, based on the determined depth map for the common scene, a predicted image based on the source image such that the predicted image has a focal distance corresponding to a particular image of the plurality of images; (v) determining a difference between the predicted image and the particular image; (vi) updating the artificial neural network based on the determined difference; and (vii) using the updated artificial neural network to determine an updated depth map for the scene based on the plurality of images.

The artificial neural network may be an autoencoder convolutional neural network. The step of determining, based on the determined depth map for the common scene, a predicted shallow depth-of-field image based on the predicted large depth-of-field image such that the predicted shallow depth-of-field image has a focal distance corresponding to the particular image of the plurality of images may comprise using a differentiable aperture rendering function. The step of obtaining the plurality of images of the scene may comprise operating a camera to capture, using respective different focal distance settings, each image of the plurality of images of the scene.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. EXAMPLE IMAGES AND APPLICATIONS

Generally, imaging may refer to capturing and storing the color and brightness characteristics of a real-world environment or scene in a digital, chemical, or other format (e.g., in photographs and/or motion video). A large variety of image capture devices exist (e.g. CCDs, photodetector arrays, active pixel sensors) to facilitate capturing images in a host of different formats (e.g., color imaging, black and white imaging).

It can be advantageous in a variety of applications to determine the depth of objects present in an image. Such a depth map could include a depth value for each location within an image, e.g., for each pixel of the image. Depth values of such a depth map could be related to the location of objects that are depicted in the image relative to each other, the distance between such objects and a camera or other sensing device used to generate the image, or to some other depth-related parameter of objects or locations represented within the image. For example, an image could depict an outdoor scene and a depth map determined for the image could describe the distance between objects and/or locations in the scene and a camera used to capture the image. Such a depth map could then be used to determine the shape and location of objects within the scene (e.g., to map the objects and locations present in the scene, to navigate a robot or other device through the scene), to perform depth-aware image processing or some other image processing on the image (e.g., to blur objects at certain depths within the scene in order to simulate a shallow depth-of-field image), or to facilitate some other applications.

Figure 1:
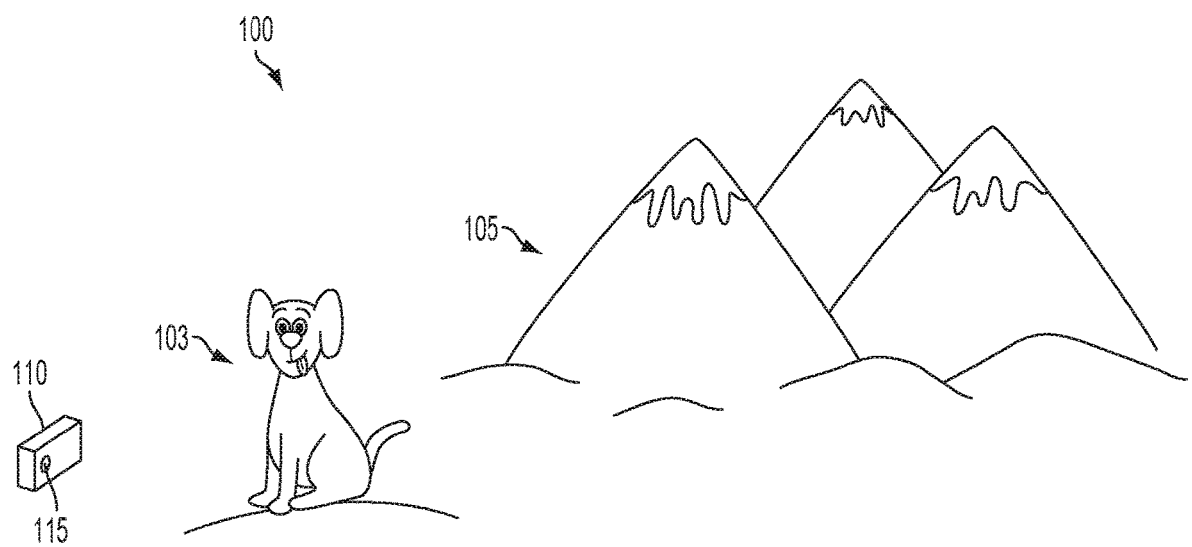
FIG. 1 depicts contents of an example scene being captured by a device.

FIG. 1 illustrates a scene 100 containing near object 103 and distant object 105. FIG. 1 additionally illustrates a device 110 disposed proximate to the near object 103 and configured to generate visible-light images of the scene 100 among other functions. Generating visible-light images of the scene 100 could include generating one or more light-field images of the scene, one or more shallow depth-of field images of the scene at different focal lengths), one or more deep depth-of-field images of the scene (e.g., using a small aperture setting), or generating some other image-related information about the scene 100.

By way of example and without limitation, device 110 may be a cellular mobile telephone (e.g., a smartphone), a still camera, a video camera, a computer (such as a desktop, notebook, tablet, or handheld computer), a personal digital assistant (PDA), a home automation component, a digital video recorder (DVR), a digital television, a remote control, a wearable computing device, or some other type of device equipped with at least one camera. It should be understood that device 110 may represent a discrete physical device such as a digital camera, a particular physical hardware platform on which a camera application operates in software, or other combinations of hardware and software that are configured to carry out camera functions.

Device 110 includes an image capture element 115 that may be operated to generate visible-light images. The image capture element 115 could include a light field camera or other components configured to generate light field images or other information about a light field received from the scene 100 to which the image capture element 115 is exposed. Such a light field camera could include a plurality of apertures, lenses, or other optical elements configured to facilitate generating image information based on light received at a respective plurality of locations of the image capture element 115. Additionally or alternatively, the image capture element 115 could include one or more cameras. Such a camera could include one or more actuators configured to adjust optical elements (e.g., a controllable aperture, one or more lenses) in order to adjust an aperture setting, a focal distance, a focal depth, or some other property of image acquisition of the image capture element 115. Such a camera could be operated to generate multiple images of the scene 100 that differ with respect to depth-of-field (e.g., by adjusting an aperture setting of the camera), to generate multiple shallow-depth-of-field images of the scene 100 at respective different focal distances, and/or to generate a large depth-of-field image of the scene 100. Additionally or alternatively, such a camera could include a small, static aperture (e.g., the camera could be a pinhole camera) configured to generate large depth-of-field images of the scene 100.

Figure 2A:
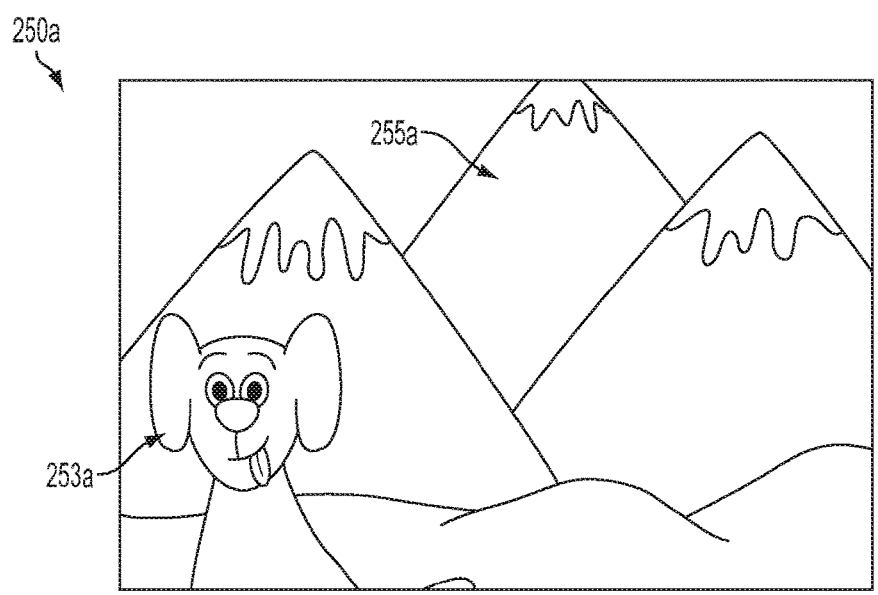
FIG. 2A is an example image of the scene depicted in FIG. 1 as captured by a camera of the device of FIG. 1.

FIG. 2A illustrates an example large depth-of-field image 250a of the scene 100, including a near object image 253a and a distant object image 255a. The example large depth-of-field image 250a having a large depth-of-field results in substantially all objects depicted in the image (e.g., 253a, 255a) being substantially in focus, irrespective of distance from the image capture element 115. Such a large depth-of-field image 250a could be generated by a camera with a small aperture (e.g., a pinhole camera) or an image capture device otherwise configured to generate images such that light received from objects at varying distances from the device are imaged in focus. Additionally or alternatively, a light field camera could be used to generate a light field image of the scene 100 and the light field image could be processed (e.g., by shearing and projecting the light field image) to generate a large depth-of-field image of the scene 100.

Figure 2B:
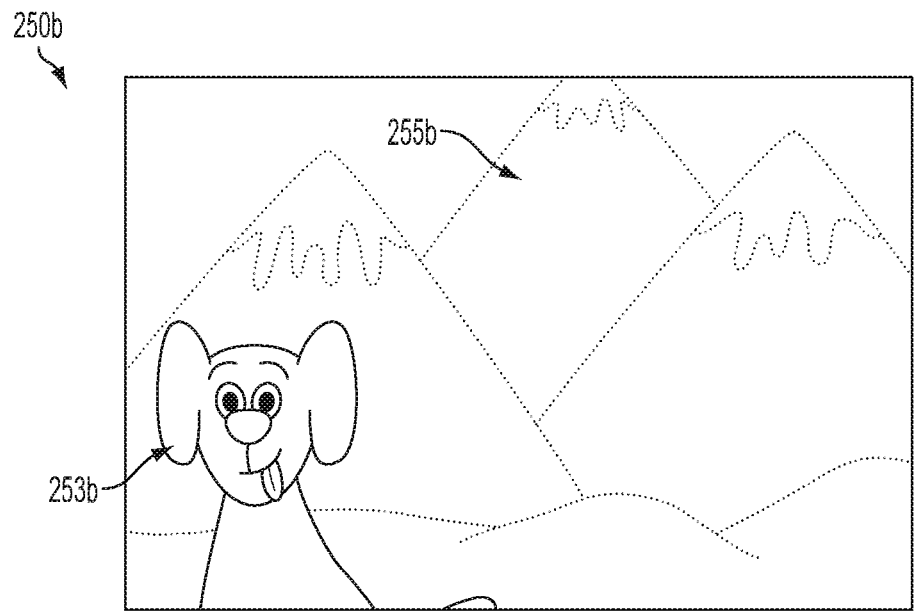
FIG. 2B is an example image of the scene depicted in FIG. 1 as captured by a camera of the device of FIG. 1.

FIG. 2B illustrates a first example shallow depth-of-field image 250b of the scene 100, including a near object image 253b and a distant object image 255b. An image (e.g., 250b) having a shallow depth-of-field results in certain objects depicted in the image being substantially in focus while other objects depicted in the image are substantially blurred and/or out of focus, depending on the distance of such objects from an imaging device (e.g., the image capture element 115) used to generate the image. The focal distance of the first shallow depth-of-field image 250b corresponds to the distance between the near object 103 and the image capture element 115 such that the near object image 253b is in focus. The distant object 105, being farther from the image capture element 115, results in the distant object image 255b being out of focus.

Figure 2C:
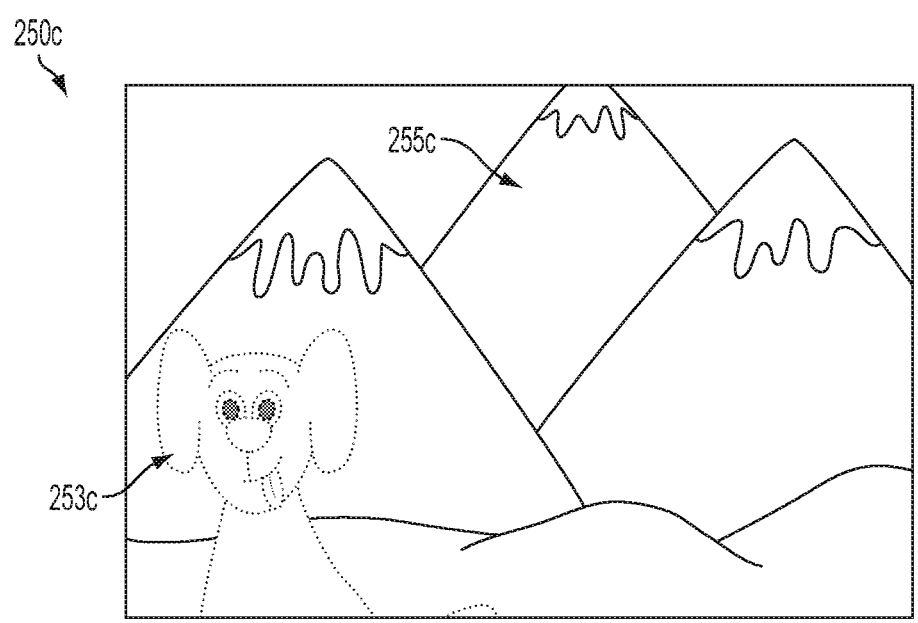
FIG. 2C is an example image of the scene depicted in FIG. 1 as captured by a camera of the device of FIG. 1.

FIG. 2C illustrates a second example shallow depth-of-field image 250c of the scene 100, including a near object image 253c and a distant object image 255c. The second shallow depth-of-field image 250c has a focal distance that is greater than the focal distance of the first example shallow depth-of-field image 250d. The focal distance of the second shallow depth-of-field image 250c corresponds to the distance between the far object 105 and the image capture element 115 such that the far object image 255c is in focus.

The near object 103, being closer to the image capture element 115, results in the near object image 253c being out of focus.

A depth map could be determined for the scene 100. Such a depth map could include a plurality of depth values representing the depths of various objects and/or locations within the scene 100. Such depth values could represent the distance between the image capture device 115 and the objects/locations within the scene. Additionally or alternatively, the depths could represent relative distances of objects or locations within the scene 100 (e.g., to the distances between objects/locations within the scene, but not to the absolute distance between such objects/locations and the image capture device 115). Such a depth map could include a set of depth values corresponding to respective locations within one of the example images 250a, 250b, 250c For example, a depth map could include a depth value corresponding to each of the pixels of one of the example images 250a, 250b, 250c.

Figure 3:
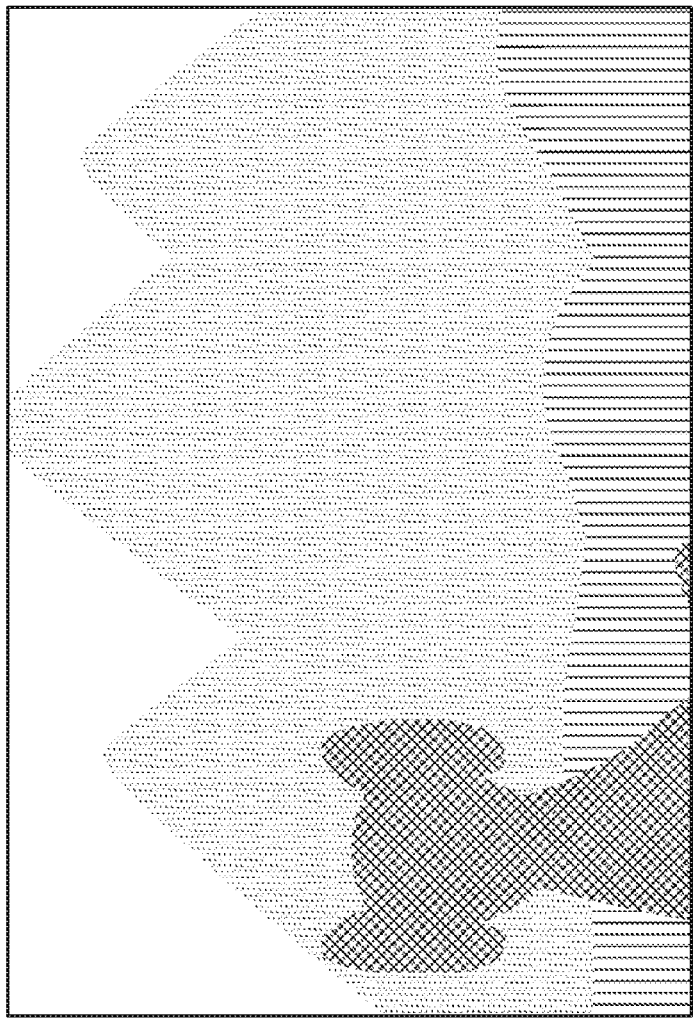
FIG. 3 depicts an example depth map of the scene depicted in FIG. 1 from the perspective of the device of FIG. 1.

FIG. 3 illustrates an example depth map 300 that could correspond to and/or be generated from one or more of the example images 250a, 250b, 250c. The example depth map 300 could correspond to the absolute distances between the image capture device 115 and objects/locations in the scene 100. The grayscale color of a particular pixel or region of the example depth map 300 corresponds to the distance between the image capture device 115 and an object/location depicted in one of the example images 250a, 250b, 250c at a pixel or region of the example image that corresponds to the particular pixel or region of the example depth map 300.

Such a depth map (e.g., 300) could be generated for a scene in a variety of ways in some examples, a distance sensor could be used to generate the depth map. This could include emitting patterns of light, sound, or other energy into the scene, detecting light, sound, or other energy responsively received from objects/locations in the scene, and using some property of the received energy a time of flight, a phase, an angle of reception) to determine depths for objects/locations in the scene. Additionally or alternatively, multiple images of the scene could be generated from respective different perspectives and the generated images could be used, based on the relative locations and angles of the different perspectives, to generate the depth map. For example, a stereo image pair could be generated of a scene, using two cameras, and stereoscopic methods could be used to determine the depth map based on the stereo image pair. In yet further examples, one or more images (e.g., 250a, 250b, 250c) taken of a scene (e.g., 100) from the same perspective could be used as a source of information to determine a depth map for the scene. This could include using an artificial neural network or some other algorithm to determine depth values for objects within one or more of the images. For example, an artificial neural network could be trained to generate depth maps, based on a training set of images and/or 'ground truth' depth maps therefor, and such a trained artificial neural network could then be applied to determine depth maps for additional images. Additionally or alternatively, other methods could be used to determine depth maps for a scene.

II. EXAMPLE IMAGE-BASED DEPTH MAP PREDICTION

A depth map can be determined, based on one or more images of a scene, in a variety of ways. In some examples, methods of pattern mapping, triangulation, stereoscopic image processing, and/or other methods may be employed to determine a depth map based on multiple images of a scene that correspond to respective different perspectives on the scene. It is also possible to determine a depth map for a scene based on a single image of the scene. This can be accomplished by determining the identity, relative location/ordering within the image, or other information about the contents of the image (e.g., about objects depicted in the image). Various machine learning techniques or other algorithms may be applied to identify objects or other contents depicted in an image, to determine the extent of such objects within an image, to determine the ordering and/or overlap of such contents within an image, or to determine some other information about objects or other contents depicted in an image and/or to determine a depth map for such an image.

In some examples, an artificial neural network (ANN) could be applied to determine a depth map or other depth information based on an image. Such an ANN could include two or more layers, could include linear, logarithmic, or otherwise-specified output functions, could include fully or otherwise-connected neurons, could include recurrent and/or feed-forward connections between neurons in different layers, could include filters or other elements to process input information and/or information passing between layers, or could be configured in some other way to facilitate the determination of depths and/or depth maps based on input images.

An ANN used to generate a depth map based on an input image could include one or more filters that could be applied to the input image and the outputs of such filters could then be applied to the inputs of one or more neurons of the ANN. For example, such an ANN could be or could include a convolutional neural network (CNN). Convolutional neural networks are a variety of ANNs that are configured to facilitate ANN-based classification or other processing based on images or other large-dimensional inputs whose elements are organized within two or more dimensions that may be related to some structure in the input structure (e.g., as relative location within the two-dimensional space of an image can be related to similarity between pixels of the image).

In the embodiments herein, a CNN includes at least one two-dimensional filter that is applied to an input image; the filtered input image is then applied to neurons of the CNN (e.g., of a convolutional layer of the CNN). The convolution of such a filter and an input image could represent the presence, location, or other information about features present in the input image (e.g., the presence and/or location of edges, faces, or other features in the input image). A set of neurons of a CNN could receive respective inputs that are determined by applying the same filter to an input image. Additionally or alternatively, a set of neurons of a CNN could be associated with respective different filters and could receive respective inputs that are determined by applying the respective filter to the input image. Such filters could be trained, during training of a CNN, or could be pre-specified. For example, such filters could represent wavelet filters, center-surround filters, biologically-inspired filter kernels (e.g., from studies of animal visual processing receptive fields), or some other pre-specified filter patterns.

A CNN or other variety of ANN could include multiple convolutional layers (e.g., corresponding to respective different filters and/or features), pooling layers, rectification layers, fully connected layers, or other types of layers. Convolutional layers of a CNN represent convolution of an input image, or of some other input (e.g., of a filtered, downsampled, or otherwise-processed version of an input image), with a filter. Pooling layers of a CNN apply nonlinear downsampling to higher layers of the CNN, e.g., by applying a maximum, average, L2-norm, or other pooling function to a subset of neurons, outputs, or other features of the higher layer(s) of the CNN. Rectification layers of a CNN apply a rectifying nonlinear function (e.g., a non-saturating activation function, a sigmoid function) to outputs of a higher layer. Fully connected layers of a CNN receive inputs from many or all of the neurons in one or more higher layers of the CNN. The outputs of neurons of a fully connected layer could be used to determine depth values for respective locations within an input image (e.g., for each of the pixels of an input image).

Neurons in a CNN can be organized according to corresponding dimensions of the input. For example, where the input is an image (a two-dimensional input), neurons of the CNN (e.g., of an input layer of the CNN, of a pooling layer of the CNN) could correspond to locations in the two-dimensional input image. Connections between neurons and/or filters in different layers of the CNN could be related to such locations. For example, a neuron in a convolutional layer of the CNN could receive an input that is based on a convolution of a filter with a portion of the input image, or with a portion of some other layer of the CNN, that is at a location proximate to the location of the convolutional-layer neuron, in another example, a neuron in a pooling layer of the CNN could receive inputs from neurons, in a layer higher than the pooling layer (e.g., in a convolutional layer, in a higher pooling layer), that have locations that are proximate to the location of the pooling-layer neuron.

An ANN could generate, based on an input image, a set of depth values such that each depth value corresponds to a respective location within the input image. In some examples, this could include the ANN generating a depth value for each of the pixels of the input image (i.e., a depth value corresponding to each of the locations of the pixels within the input image). In some examples, the set of depth values output from the ANN could be upsampled to generate a depth map (e.g., to generate a depth map having a resolution equal to the resolution of the input image).

A variety of methods could be used to upsample depth values output by an ANN or other algorithm to generate a depth map for an input image. In some examples, the upsampling could be performed in an edge-aware manner relative to the input image. For example, a bilateral method could be used to upsample a number of depth values, based on an input image, such that the output depth map exhibits, e.g., edges or other sharp features at locations corresponding to edges or other sharp features that are present in the input image. Such a bilateral method could generate depth values of such a depth map such that a bilateral cost function is reduced. The bilateral cost function could include one or more terms related to the similarity between the output depth map and the input depth values and one or more additional terms related to the smoothness of the output depth map. The one or more smoothness terms could be determined such that the cost function is increased more by sharp features in the output depth map that do not correspond to sharp features in the input image than by sharp features in the output depth map that do correspond to sharp features in the input image (e.g., edges of objects or other edges depicted in the input image).

III. EXAMPLE TRAINING METHODS

An ANN or other algorithm used to generate depth maps from images can be trained to improve the quality of the generated depth maps. This training can include iteratively or otherwise updating the ANN (or other algorithm) based on a set of training images. Such training could include applying a particular training image to the ANN, determining an output depth map, and then determining an error or loss based on a degree of correspondence between the predicted depth map and a "ground truth" depth map (or other training data). The ANN can then be updated (e.g., via backpropagation) based on the determined degree of correspondence.

In practice, it can be difficult to access such "ground truth" depth information. Such information can be generated directly, using a distance sensor (e.g., a laser rangefinder, a LIDAR, an ultrasonic distance sensor), but such sensors can be expensive and difficult to operate, and the depth information generated by such sensors can be low-resolution, noisy, or otherwise low-quality. Depth information can be generated by capturing multiple images of a scene, from respective different perspectives (e.g., using a stereo camera), and using stereoscopic algorithms or other methods to generate a depth map for a scene based on divergences or other correspondences between images of a scene. However, such multi-perspective setups can be expensive and difficult to operate, and can result in the generation of depth maps that exhibit certain errors (e.g., errors that are asymmetric with respect to horizontal and vertical depth cues that are present within the images of the scene).

The methods described herein can improve the above shortcomings by facilitating the training of ANNs based on image information captured from a single perspective. The image information captured from a particular perspective includes, or permits the generation of, multiple different images of the scene that differ with respect to aperture, focal depth, focal distance, or some other depth-related image property. An untrained ANN is then used to generate a depth map based on at least one of the different images. This predicted depth map is used to generate, based on the at least one image, a simulated image. The simulated image corresponds, with respect to aperture, focal depth, focal length, and/or some other depth-related image property, to one of the "true" images of the scene. A degree of correspondence between the simulated image and the "true" image is then used to update the ANN.

Such a method is suited to determining depth maps used to apply depth-dependent blur to images (e.g., to generate "portrait"-like images from large depth-of-focus images generated, e.g., by a camera of a cell phone). This is because this training method can use differences between a simulated "blurry" image and an image that corresponds to the simulated "blurry" image with respect to aperture. Aperture is an image property that can be related to the "blurriness" of images that are not "all in focus." Accordingly, in examples where such a trained ANN generates an inaccurate depth map based on an input image of a scene, the inaccuracies in the generated depth map are likely, when the depth map is used to apply depth-dependent blur to an input image, to result in a blurred version of the input image that more accurately simulates depth-dependent image blur.

Sets of images or other image information could be acquired, as described herein, for a plurality of different scenes and/or perspectives thereof in order to generate a plurality of images for training an ANN. Sets of images or other image information used to train an ANN could be acquired in a variety of ways. In some examples, one or more cameras or other image-capture apparatus could be operated, from a single perspective, to generate a set of images of a scene. The images of the sequence could vary with respect to aperture setting, focal depth, focal distance, and/or some other image property. For example, a single camera could take a number of different images of a scene at respective different focal distances (e.g., by operating an actuator or other means to control the focal distance of optics of the camera). Additionally or alternatively, a light field camera could be used to generate a light field for the scene. The light field could then be used to generate a set of different images of the scene, e.g., at respective different aperture settings. This could include shearing and slicing the light field to generate the one or more images. Sets of images of scenes could be acquired in some other manner in order to facilitate the training of an ANN.

In some examples, a set of images used to train an ANN could differ with respect to depth-of-field and/or aperture setting. Such a set of images could include a first image having a first depth-of-field (e.g., an image that is all-in-focus or that otherwise exhibits a large depth-of-field) and a second image having a second depth-of-field (e.g., a shallow depth-of-field image) that is less than the first depth of field. As described above, such images could be acquired by operating one or more cameras according to different settings (e.g., different aperture settings), by generating the images from a single light field image, or by some other method. An ANN could be applied to the first image (e.g., the image that is all-in-focus and/or that has the greater depth-of-field) to generate a depth map. The generated depth map could be used to distort the first image, creating a predicted image that has a simulated depth-of-field that corresponds to the depth-of-field of the second image. Differences between the second image and the predicted image could then be used to update the ANN. Such a process could occur a plurality of times, using the first and second images and/or using additional sets of images, to train the ANN. The trained ANN could then be used to determine depth maps for additional images (e.g., images captured using cell phones).

Figure 4:
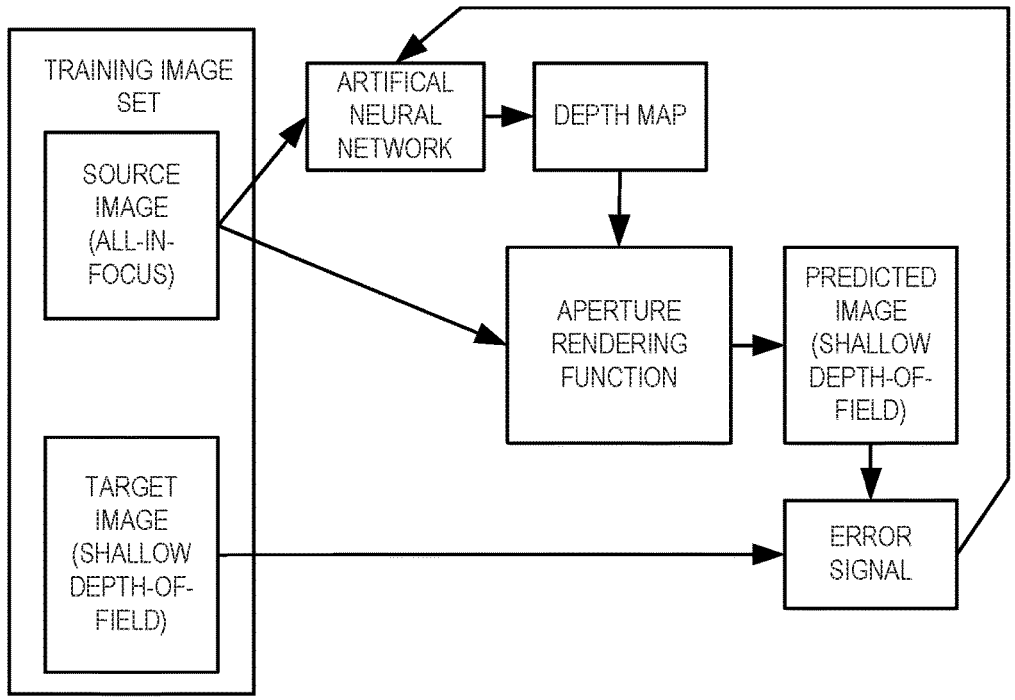
FIG. 4 illustrates an example method.

FIG. 4 shows an example flow chart illustrating elements of such an ANN training method. A plurality of images ("TRAINING IMAGE SET") includes a source image "SOURCE IMAGE") and a target image ("TARGET IMAGE") that depict a common scene (e.g., the source and target images depict a particular location of a park from the same perspective). The source image has a first depth-of-field such that the source image is all-in-focus. The target image has a second depth-of-field that is less than the first depth-of field such that the second image has a shallow depth-of-field.

An ANN ("ARTIFICIAL NEURAL NETWORK") is used to determine a depth map ("DEPTH MAP"), for the scene depicted in the source and target images, based on the source image. The ANN could be configured in a variety of ways (e.g., as described above) to provide a depth map based on an input image. For example, the ANN could be a convolutional neural network. An aperture rendering function ("APERTURE RENDERING FUNCTION") is then used to distort the source image, based on the depth map, to generate a predicted image ("PREDICTED IMAGE") such that the predicted image has a depth-of-field corresponding to the second depth-of-field (i.e., the depth-of-field of the target image). Thus, if the depth map output by the ANN accurately represents the depth of objects depicted in the source and target images, the predicted image should correspond to the target image.

Differences between the predicted image and the target image can be determined ("ERROR SIGNAL") and used to update the ANN. Such determined differences could include a difference image determined by, e.g., subtracting the values of corresponding pixels between the predicted image and the target image. Updating the ANN can include applying a loss function to the determined differences between the predicted image and the target image, performing backpropagation, determining a gradient of the differences with respect to coefficients of the ANN, or updating the ANN, based on the determined differences, according to some other method.

The aperture rendering function could include a variety of methods or transformations in order to, based on a depth map corresponding to the input image, distort an input image of a scene into a predicted image. The aperture rendering function performs such a distortion such that the predicted image corresponds to an image that could have been taken of the scene with a specified aperture setting, focal distance, focal depth, or other specified image property that is related to the depth of objects or locations depicted in the input image. For example, the aperture rendering function could generate a predicted light field based on an all-in-focus input image and the depth map. The aperture rendering function could then slice and shear the determined light field to generate the predicted image. In some examples, the aperture rendering function could be differentiable (e.g., could include performing one or more differentiable transformations or other processes) with respect to the depth map such that backpropagation could be used to update the ANN (e.g., by backpropagating the determined differences between the predicted image and the target image through the differentiable aperture rendering function).

The processes described above for updating an ANN (e.g., in connection with FIG. 4) could be performed a plurality of times to train an ANN. For example, the processes could be performed iteratively until the ANN converges (e.g., until the degree of change in the ANN coefficients in each iteration reduces below a specified absolute or relative level), until a measure of the magnitude of the determined error signals (e.g., a sum of squared errors, a sum of rectified errors) in each iteration reduces below a specified absolute or relative level, for a specified number of iterations, or according to some other condition.

Further, more than two images of a particular scene could be used to generate information to train the ANN. For example, a set of training images (e.g., as in FIG. 4) of a particular scene could include multiple target images having shallow depth-of-field and having respective different aperture settings (or differing with respect to some other image property, e.g., focal distance). In such an example, an aperture rendering function could be used, based on a predicted depth map, to distort a source image multiple times to generate multiple predicted images. Each of the predicted images could correspond, with respect to aperture setting or some other image property, to a respective one of the multiple target images. Differences could then be determined between each paired target image and predicted image and used to update the ANN.

Yet further, the embodiments described in connection with FIG. 4 are intended as illustrative example embodiments and are not intended to be limiting. For example, a plurality of images used to train an ANN could include a plurality of sets of images corresponding to respective different scenes. Each such set of images could include one or more all-in-focus images, shallow depth-of-field images, or other images of a common scene that could be used to perform one or more elements of the ANN training methods described herein. In such examples, each set of images could provide one (or more) difference images or other error information that could be used (e.g., in combination with such information determined from other sets of images) to update an ANN.

In some examples, a set of images of a scene that are used to train an ANN could include a number of shallow depth-of-field images that differ with respect to focal distance. As described above, such images could be acquired by operating one or more cameras according to different settings (e.g., different focal distance settings), by generating the images from a single light field image, or by some other method. An ANN could be applied to one or more of the images to generate a depth map. The generated depth map could be used to predict, based on the set of images of the scene, a large depth-of-field image (e.g., an all-in-focus image) of the scene. The depth map could then be used to distort the predicted large depth-of-field image one or more times, creating one or more predicted shallow depth-of-field images that have simulated focal distances, aperture settings, or other image properties that correspond to respective images from the set of images of the scene. the depth-of-field of the second image. Differences between the predicted shallow depth-of-field images and the corresponding images from the training set could then be used to update the ANN. Such a process could occur a plurality of times, using the set of images of the scene and/or using additional sets of images of respective additional scenes, to train the ANN. The trained ANN could then be used to determine depth maps for additional images (e.g., images captured using cell phones).

Figure 5:
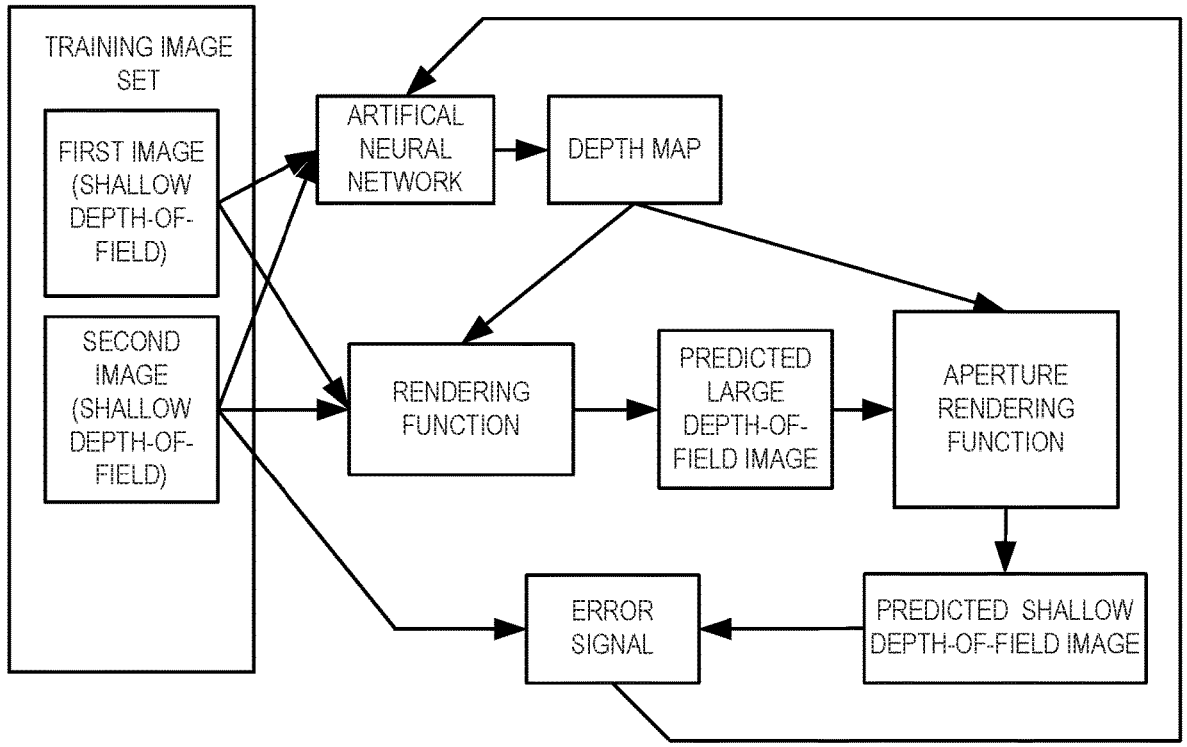
FIG. 5 illustrates an example method.

FIG. 5 shows an example flow chart illustrating elements of such an ANN training method. A plurality of images ("TRAINING IMAGE SET") includes a first image "FIRST IMAGE") and a second image ("SECOND IMAGE") that depict a common scene (e.g., the first and second images depict a particular location of a park from the same perspective). The first image has a shallow depth-of-field and a first focal distance such that elements of the scene that are at or near the first focal distance are depicted in-focus in the first image. The second image also has a shallow depth-of-field and has a second focal distance, which differs from the first focal distance, such that elements of the scene that are at or near the second focal distance are depicted in-focus in the second image.

An ANN ("ARTIFICIAL NEURAL NETWORK") is used to determine a depth map ("DEPTH MAP"), for the scene depicted in the first and second images, based on one or more of the first and second images. The ANN could be configured in a variety of ways (e.g., as described above) to provide a depth map based on an input image. For example, the ANN could be a convolutional neural network. A rendering function ("RENDERING FUNCTION," e.g., an aperture rendering function) is then used to predict a large depth-of-field image ("PREDICTED LARGE DEPTH-OF-FIELD IMAGE") for the scene based on the depth map and one or more of the first and second images. In some examples, the rendering function could be or include an aperture rendering function as described elsewhere herein. Additionally or alternatively, the rendering function could use image reconstruction techniques from plenoptic imaging or some other methods to generate all-in-focus images from multiple shallow depth-of-field images.

An aperture rendering function ("APERTURE RENDERING FUNCTION") is then used to distort the predicted large depth-of-field image, based on the depth map, to generate a shallow depth-of-field image ("PREDICTED SHALLOW DEPTH-OF-FIELD IMAGE") such that the predicted shallow depth-of-field image has a focal distance corresponding to the second focal distance (i.e., the focal distance of the second image). Thus, if the depth map output by the ANN accurately represents the depth of objects depicted in the first and second images, the predicted shallow depth-of-field image should correspond to the second image.

Differences between the predicted shallow depth-of-field image and the second image can be determined ("ERROR SIGNAL") and used to update the ANN. Such determined differences could include a difference image determined by, e.g., subtracting the values of corresponding pixels between the predicted shallow depth-of-field image and the second image. Updating the ANN can include applying a loss function to the determined differences between the predicted image and the target image, performing backpropagation, determining a gradient of the differences with respect to coefficients of the ANN, or updating the ANN, based on the determined differences, according to some other method. In some examples, the ANN could be an autoencoder ANN, with the depth map representing the internal "code" layer of the autoencoder ANN. In such examples, ANN training techniques suited to the training of autoencoder ANNs (e.g., unsupervised training techniques) could be applied to update the ANN.

The processes described above for updating an ANN (e.g., in connection with FIG. 5) could be performed a plurality of times to train an ANN. For example, the processes could be performed iteratively until the ANN converges (e.g., until the degree of change in the ANN coefficients in each iteration reduces below a specified absolute or relative level), until a measure of the magnitude of the determined error signals (e.g., a sum of squared errors, a sum of rectified errors) in each iteration reduces below a specified absolute or relative level, for a specified number of iterations, or according to some other condition.

Further, more than two images of a particular scene could be used to generate information to train the ANN. For example, a set of training images (e.g., as in FIG. 5) of a particular scene could include additional shallow depth-of-field images and having respective different focal distances (or differing with respect to some other image property, e.g., aperture setting). In such an example, an aperture rendering function could be used, based on a predicted depth map, to distort a predicted large depth-of-field image multiple times to generate multiple predicted shallow depth-of-field images. Each of the predicted shallow depth-of-field images could correspond, with respect to focal distance or some other image property, to a respective one of the multiple shallow depth-of-field images of the training set. Differences could then be determined between each paired input shallow depth-of-field image and predicted shallow depth-of-field image and used to update the ANN.

Yet further, the embodiments described in connection with FIG. 5 are intended as illustrative example embodiments and are not intended to be limiting. For example, a plurality of images used to train an ANN could include a plurality of sets of images corresponding to respective different scenes. Each such set of images could include one or more all-in-focus images, shallow depth-of-field images, or other images of a common scene that could be used to perform one or more elements of the ANN training methods described herein. In such examples, each set of images could provide one (or more) difference images or other error information that could be used (e.g., in combination with such information determined from other sets of images) to update an ANN.

An ANN could be trained according to the techniques described herein by a server, cloud computing service, or other computing system. The system used to train the ANN could then apply the trained ANN to determine depth maps for further images. For example, the system could receive additional images (e.g., from a cell phone, digital camera, or other image-capturing system) and apply the trained ANN to such images to generate depth maps for such images. The system could then, e.g., transmit the determined depth map to whatever device or system provided the additional image(s).

Additionally or alternatively, a server or other system could train an ANN as described herein and then transmit an indication of the trained ANN (e.g., an indication of the coefficients, internal structure, or other specifics of the trained ANN) to some other system. The other system could then operate to apply the trained ANN to additional images. For example, a server could train an ANN as described herein and then transmit an indication of the trained ANN to a cell phone (e.g., via the interact and/or a cellular data network). The cell phone could then operate to apply the trained ANN to images (e.g., images captured via a camera of the cell phone) to generate depth maps for such images. Transmitting an indication of a trained ANN could include transmitting information, via wired or wireless components, to an already-operating system (e.g., to a cell phone, digital camera, or other device in communication with the internet. Additionally or alternatively, transmitting an indication of a trained ANN to a system could occur during assembly and/or programming of the system. For example, transmitting an indication of a trained ANN could include programming a controller or memory (e.g., a flash memory or some other non-transitory computer-readable medium) with the trained ANN and subsequently integrating the controller or memory into a device or other system.

Note that, while the images used to train ANNs as described herein may be characterized as "training data" or "training images" used to train an ANN for later application to further images of interest (e.g., images captured by a cell phone), these characterizations are intended as non-limiting examples of the methods described herein. An ANN may be trained using two or more images of a scene of interest and then used, based on one of the images, to generate a depth map for the scene. For example, a cell phone or other image-capturing system could operate (e.g., using a camera of the cell phone) to capture multiple images of a scene having respective different aperture settings, focal distances, or some other image property. A processor of the cell phone, or a processor in communication with the cell phone, could then use the multiple images to train an ANN. The trained ANN could then be used to generate a depth map for the scene, based on one or more of the captured images.

IV. ILLUSTRATIVE SYSTEMS

Figure 6:
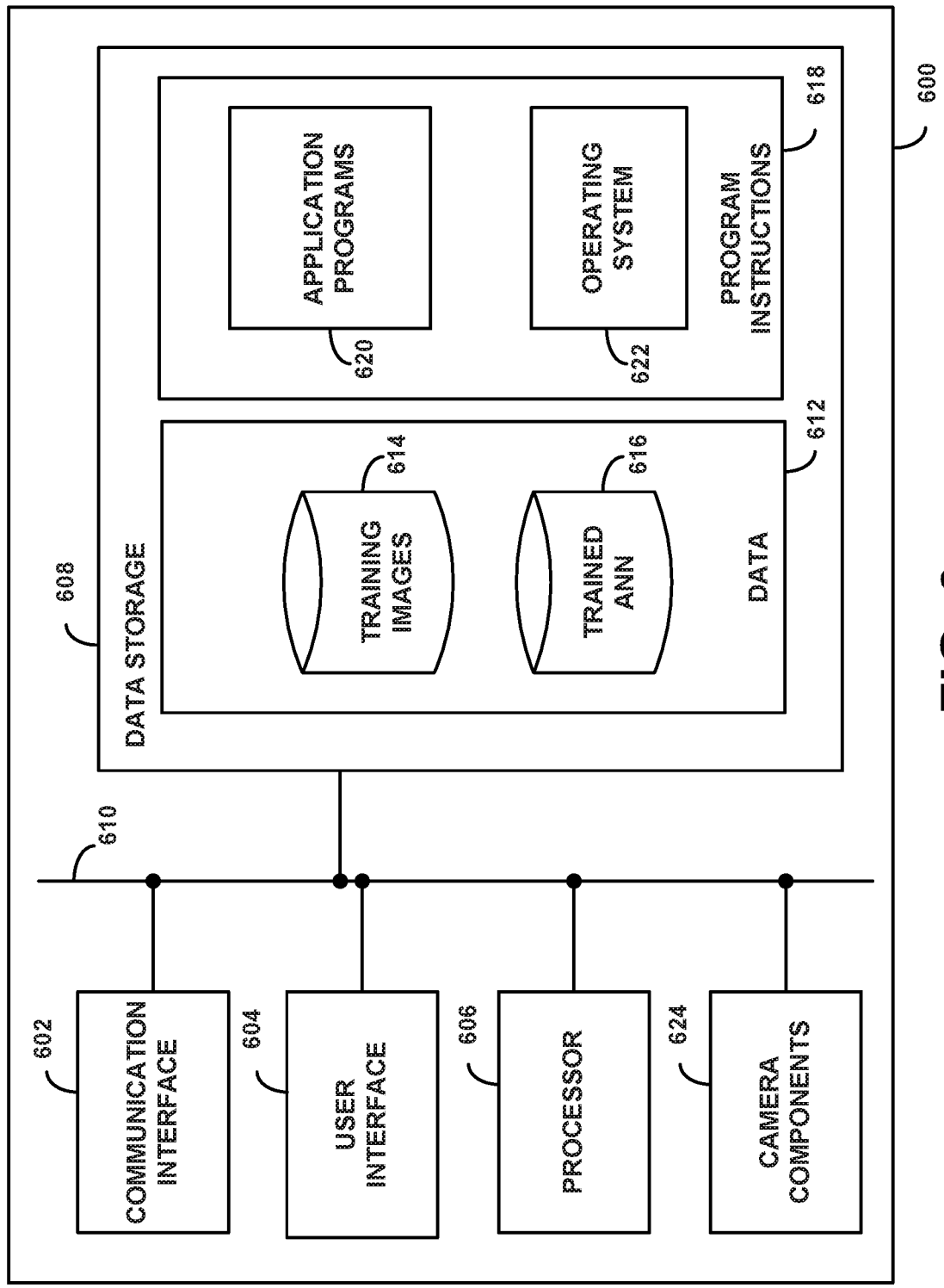
FIG. 6 is a simplified block diagram showing some of the components of an example computing system.

Computational functions (e.g., functions to use an ANN to generate a depth map based on one or more images and/or to train such an ANN based on a plurality of images) described herein may be performed by one or more computing systems. Such a computing system may be integrated into or take the form of a computing device, such as a mobile phone, tablet computer, laptop computer, server, cloud computing network, and/or programmable logic controller. For purposes of example, FIG. 6 is a simplified block diagram showing some of the components of an example computing device 600 that may include camera components 624. Camera components 624 may include one or more cameras, such as visible light cameras, infrared cameras, light field cameras, plenoptic cameras, or other types of cameras.

By way of example and without limitation, computing device 600 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, a robot, a drone, an autonomous vehicle, or some other type of device that may be equipped with at some image capture and/or image processing capabilities. It should be understood that computing device 600 may represent a physical camera device such as a digital camera, a particular physical hardware platform on which a camera application operates in software, or other combinations of hardware and software that are configured to carry out image capture and/or image processing functions.

As shown in FIG. 6, computing device 600 may include a communication interface 602, a user interface 604, a processor 606, data storage 608, and camera components 624, all of which may be communicatively linked together by a system bus, network, or other connection mechanism 610.

Communication interface 602 may function to allow computing device 600 to communicate, using analog or digital modulation of electric, magnetic, electromagnetic, optical, or other signals, with other devices, access networks, and/or transport networks. Thus, communication interface 602 may facilitate circuit-switched and/or packet-switched communication, such as plain old telephone service (POTS) communication and/or Internet protocol (IP) or other packetized communication. For instance, communication interface 602 may include a chipset and antenna arranged for wireless communication with a radio access network or an access point. Also, communication interface 602 may take the form of or include a wireline interface, such as an Ethernet, Universal Serial Bus (USB), or High-Definition Multimedia Interface (HDMI) port. Communication interface 602 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 602. Furthermore, communication interface 602 may comprise multiple physical communication interfaces (e.g., a Wifi interface, a BLUETOOTH® interface, and a wide-area wireless interface).

In some embodiments, communication interface 602 may function to allow computing device 600 to communicate, with other devices, remote servers, access networks, and/or transport networks. For example, the communication interface 602 may function to access a trained ANN via communication with a remote server or other remote device or system in order to allow the computing device 600 to use the trained ANN to generate depth maps based on captured images. For example, the computing system 600 could be a cell phone, digital camera, or other image capturing device and the remote system could be a server containing a memory containing such a trained ANN. Additionally or alternatively, the remote system could include cameras, or other image capture devices, configured to generate large depth-of-field images, all-in-focus images, shallow depth-of-field images, light field images, or other image information that could be accessed as described above by computing device 600 and used, by the computing device 600, to train an ANN as described herein.

User interface 604 may function to allow computing device 600 to interact with a user, for example to receive input from and/or to provide output to the user. Thus, user interface 604 may include input components such as a keypad, keyboard, touch-sensitive or presence-sensitive panel, computer mouse, trackball, joystick, microphone, and so on. User interface 604 may also include one or more output components such as a display screen which, for example, may be combined with a presence-sensitive panel. The display screen may be based on CRT, LCD, and/or LED technologies, or other technologies now known or later developed. User interface 604 may also be configured to generate audible output(s), via a speaker, speaker jack, audio output port, audio output device, earphones, and/or other similar devices.

In some embodiments, user interface 604 may include a display that serves as a viewfinder for still camera and/or video camera functions supported by computing device 600 (e.g., for functions of images captured using the camera components 624). Additionally, user interface 604 may include one or more buttons, switches, knobs, and/or dials that facilitate the configuration and focusing of the camera components 624 and the capturing of images using the camera components 624. It may be possible that some or all of these buttons, switches, knobs, and/or dials are implemented as functions on a touch- or presence-sensitive panel. User interface 604 may be configured to permit a user to initiate functions or processes described herein, e.g., to generate, using a trained ANN, a depth map for a captured image and to perform processing on the captured image based on the determined depth map (e.g., to simulate a shallow depth-of-field image as part of a "portrait mode" camera application).

Processor 606 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other applications or functions. Data storage 608 may include one or more volatile and/or non-volatile storage components, such as magnetic, optical, flash, or organic storage, and may be integrated in whole or in part with processor 606. Data storage 608 may include removable and/or non-removable components.

Processor 606 may be capable of executing program instructions 618 (e.g., compiled or non-compiled program logic and/or machine code) stored in data storage 608 to carry out the various functions described herein. Therefore, data storage 608 may include a non-transitory computer-readable medium, having stored thereon program instructions that, upon execution by computing device 600, cause computing device 600 to carry out any of the methods, processes, or functions disclosed in this specification and/or the accompanying drawings. The execution of program instructions 618 by processor 606 may result in processor 606 using data 612.

By way of example, program instructions 618 may include an operating system 622 (e.g., an operating system kernel, device driver(s), and/or other modules) and one or more application programs 620 (e.g., camera functions, ANN training, image-based depth map generation) installed on computing device 600. Data 612 may include training images 614 and/or one or more trained ANNs 616. Training images 614 may be used to train an ANN as described herein (e.g., to generate and/or update the trained ANN 616). The trained ANN 616 may be applied to generate depth maps based on input images (e.g., images captured using the camera components 624 and/or accessed via the communication interface 602).

Application programs 620 may communicate with operating system 622 through one or more application programming interfaces (APIs). These APIs may facilitate, for instance, application programs 620 reading and/or writing a trained ANN 616, transmitting or receiving information via communication interface 602, receiving and/or displaying information on user interface 604, capturing images using camera components 624, and so on.

Application programs 620 may take the form of "apps" that could be downloadable to computing device 600 through one or more online application stores or application markets (via, e.g., the communication interface 602). However, application programs can also be installed on computing device 600 in other ways, such as via a web browser or through a physical interface (e.g., a USB port) of the computing device 600.

Camera components 624 may include, but are not limited to, an aperture, shutter, recording surface (e.g., photographic film and/or an image sensor), lens, and/or shutter. Camera components 624 may be controlled at least in part by software executed by processor 606 (e.g., by application programs 620). Further, camera components 624 may include multiple camera systems, which each camera system includes a respective aperture, shutter, recording surface, lens, image sensor, processor, and/or other elements.

When multiple camera systems are included, there may be some components that are shared between the systems, and other components that are not shared. For example, each camera could include its own aperture, lens, and image sensor, while sharing other components such as a processor, a data bus, and/or a shutter button. As another example, each camera could include its own lens, but share the same image sensor. Alternatively, an individual camera system's components may be utilized only for that individual camera system, and not shared with other camera systems.

V. EXAMPLE METHODS

Figure 7:
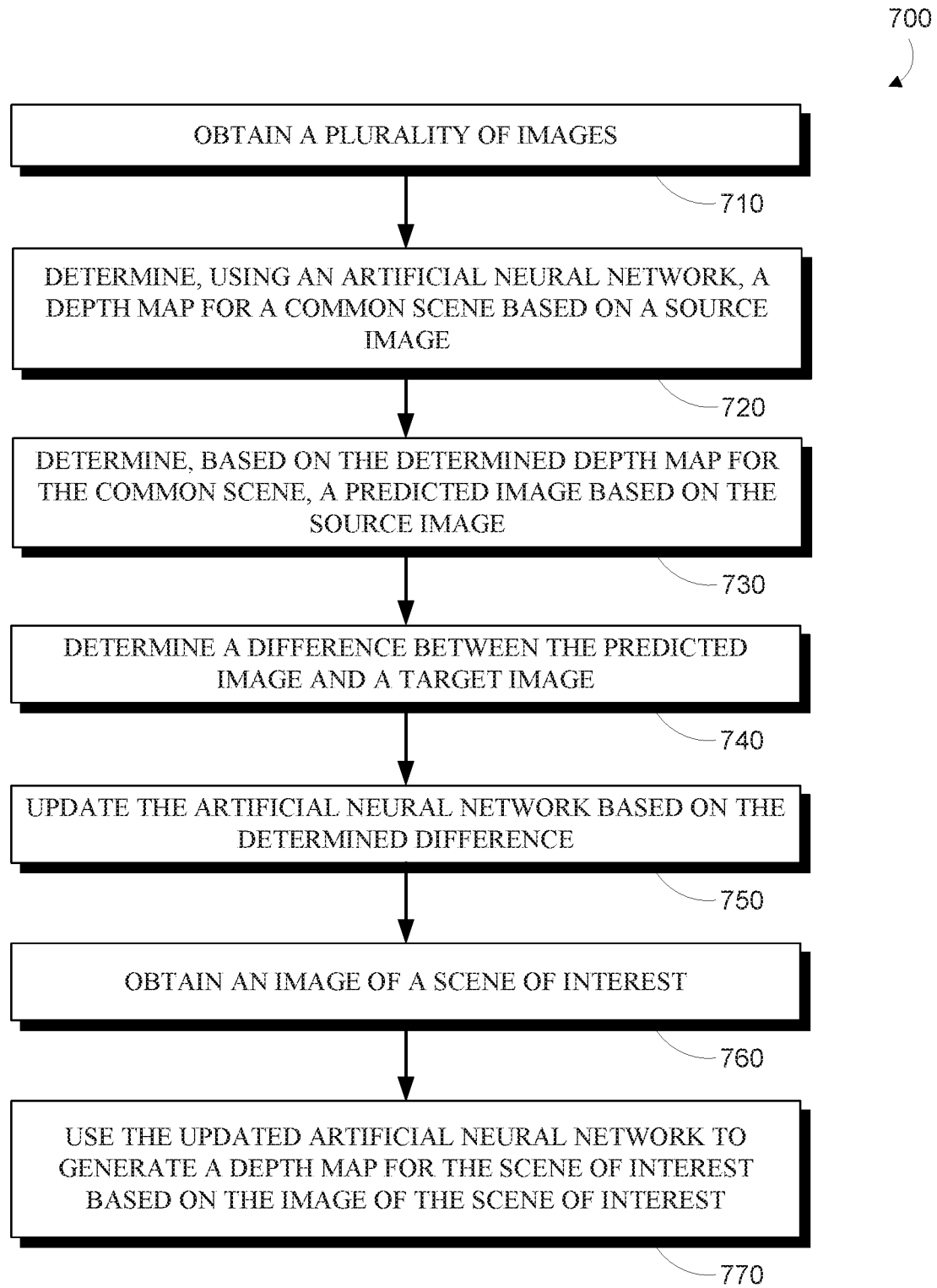
FIG. 7 is a flowchart of a method.

FIG. 7 is a flowchart of a method 700 for training an ANN to determine depth maps for input images. The method 700 includes obtaining a plurality of images (710). A set of at least two images of the plurality of images describe a common scene and the set of at least two images includes a source image having a first depth-of-field and a target image having a second depth-of-field. The second depth-of-field is less than the first depth-of-field. The method 700 additionally includes determining, using an artificial neural network, a depth map for the common scene based on the source image (720). The method 700 additionally includes determining, based on the determined depth map for the common scene, a predicted image based on the source image such that the predicted image has a depth-of-field corresponding to the second depth-of-field (730). The method 700 additionally includes determining a difference between the predicted image and the target image (740) and updating the artificial neural network based on the determined difference (750). The method 700 additionally includes obtaining an image of a scene of interest (760) and using the updated artificial neural network to generate a depth map for the scene of interest based on the image of the scene of interest (770).

These embodiments could include additional elements or features. In some embodiments, determining, based on the first depth map, a predicted image based on the source image could include using a differentiable aperture rendering function. Using a differentiable aperture rendering function could include determining an estimated light field based on the source image and, based on the first depth map, shearing and projecting the estimated light field to determine the predicted image.

In some embodiments, using the artificial neural network to determine the depth map for the common scene based on the source image could include determining, using the artificial neural network, a set of depth values based on the source image, wherein each depth value of the set of depth values corresponds to a respective location within the source image; and upsampling the set of depth values to generate the depth map for the common scene. Upsampling the set of depth values to generate the depth map for the common scene could include using a bilateral method to upsample the set of depth values based on the source image.

In some embodiments, the target image is a first target image, the predicted image is a first predicted image, and the determined difference is a first determined difference. In such embodiments, the set of at least two images further includes a second target image having a third depth-of-field that differs from the second depth-of-field and that is less than the first depth-of-field. Such embodiments further include determining, based on the determined depth map for the common scene, a second predicted image based on the source image such that the second predicted image has a depth-of-field corresponding to the third depth-of-field; and determining a second difference between the second predicted image and the second target image. In such embodiments, updating the artificial neural network includes updating the neural network based on the second difference.

In some embodiments, obtaining the set of at least two images that describe the common scene includes capturing, using a light field camera, a light field from the common scene; generating the source image based on the captured light field such that the source image has the first depth-of-field; and generating the target image based on the captured light field such that the target image has the second depth-of-field.

In some embodiments, obtaining the set of at least two images that describe the common scene includes: capturing, using a camera set to a first aperture setting, the source image; and capturing, using the camera set to a second aperture setting, the target image, wherein the second aperture setting is wider than the first aperture setting.

In some embodiments, obtaining the image of the scene of interest includes operating a cell phone to capture the image of the scene of interest. Such embodiments can further include transmitting, from a server to the cell phone, an indication of the updated artificial neural network. In such embodiments, using the updated artificial neural network to generate the depth map for the scene of interest based on the image of the scene of interest includes a processor of the cell phone using the updated artificial neural network to generate the depth map for the scene of interest.

Some of the above embodiments can further include performing image processing on the image of the scene of interest based on the determined depth map for the scene of interest.

In some of the above embodiments, the artificial neural network is a convolutional neural network.

Figure 8:
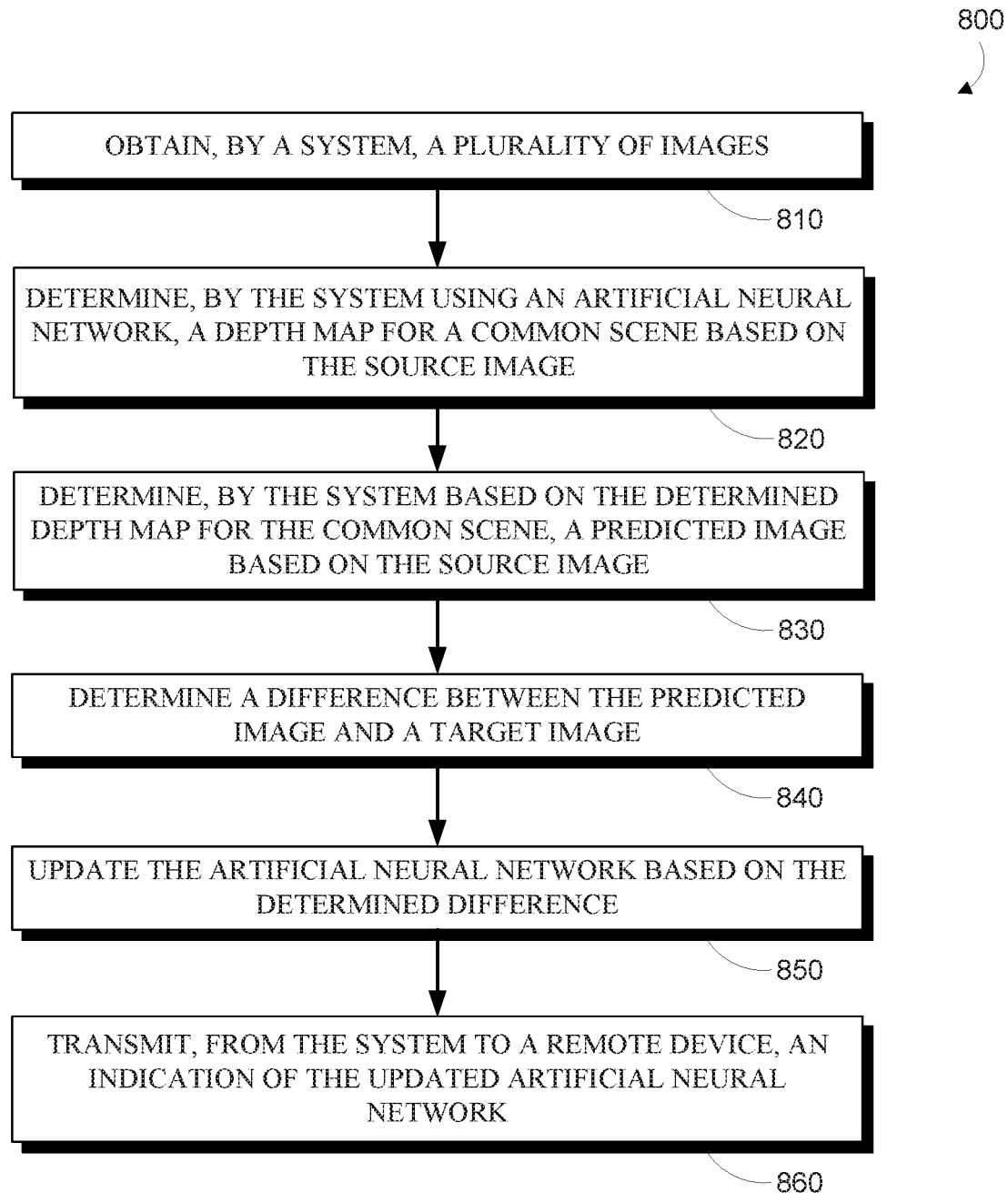
FIG. 8 is a flowchart of a method.

FIG. 8 is a flowchart of a method 800 for training an ANN to determine depth maps for input images. The method 800 includes obtaining, by a system, a plurality of images (810). A set of at least two images of the plurality of images describe a common scene and the set of at least two images includes a source image having a first depth-of-field and a target image having a second depth-of-field. The second depth-of-field is less than the first depth-of-field. The method 800 additionally includes determining, by the system using an artificial neural network, a depth map for the common scene based on the source image (820). The method further includes determining, by the system based on the determined depth map for the common scene, a predicted image based on the source image such that the predicted image has a depth-of-field corresponding to the second depth-of-field (830). The method 800 additionally includes determining, by the system, a difference between the predicted image and the target image (840) and updating, by the system, the artificial neural network based on the determined difference (850). The method additionally includes transmitting, from the system to a remote device, an indication of the updated artificial neural network (860).

These embodiments could include additional elements or features. In some embodiments, determining, based on the first depth map, a predicted image based on the source image includes using a differentiable aperture rendering function. Using the differentiable aperture rendering function to determine the predicted image can include determining an estimated light field based on the source image; and, based on the first depth map, shearing and projecting the estimated light field to determine the predicted image.

In some embodiments, the target image is a first target image, the predicted image is a first predicted image, and the determined difference is a first determined difference. In such embodiments, the set of at least two images further includes a second target image having a third depth-of-field that differs from the second depth-of-field and that is less than the first depth-of-field. Such embodiments can further include determining, based on the determined depth map for the common scene, a second predicted image based on the source image such that the second predicted image has a depth-of-field corresponding to the third depth-of-field; and determining a second difference between the second predicted image and the second target image. In such embodiments, updating the artificial neural network can include updating the neural network based on the second difference.

In some embodiments, the artificial neural network is a convolutional neural network.

Figure 9:
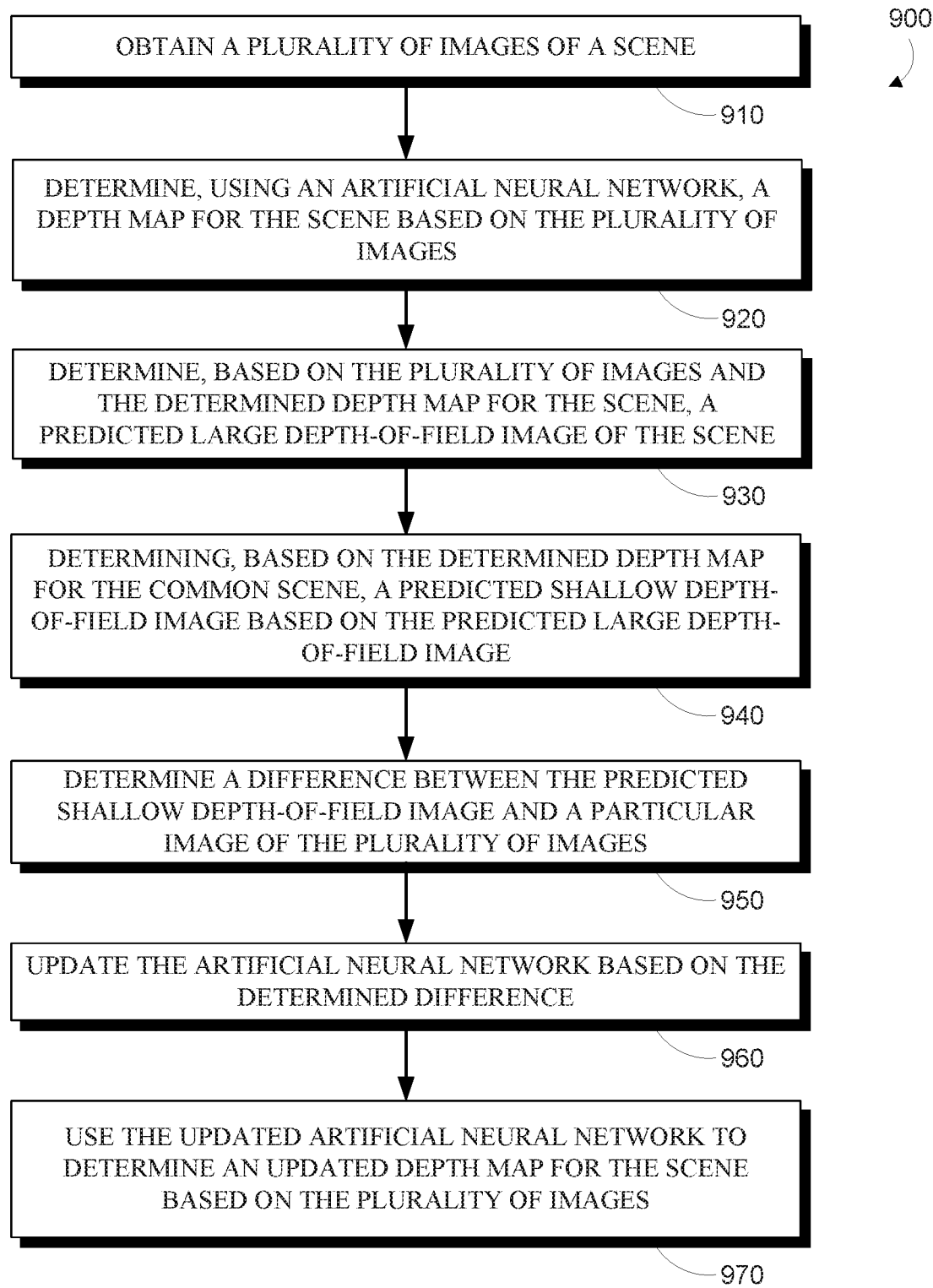
FIG. 9 is a flowchart of a method.

FIG. 9 is a flowchart of a method 900 for training an ANN to determine depth maps for input images. The method 900 includes obtaining a plurality of images of a scene (910). The images each have a shallow depth-of-field and differ with respect to focal distance. The method 900 additionally includes determining, using an artificial neural network, a depth map for the scene based on the plurality of images (920) and determining, based on the plurality of images and the determined depth map for the scene, a predicted large depth-of-field image of the scene (930). The method 900 additionally includes determining, based on the determined depth map for the common scene, a predicted shallow depth-of-field image based on the predicted large depth-of-field image (940) such that the predicted shallow depth-of-field image has a focal distance corresponding to a particular image of the plurality of images. The method 900 additionally includes determining a difference between the predicted shallow depth-of-field image and the particular image (950); updating the artificial neural network based on the determined difference (960); and using the updated artificial neural network to determine an updated depth map for the scene based on the plurality of images (970).

These embodiments could include additional elements or features. In some embodiments, determining, based on the determined depth map for the common scene, a predicted shallow depth-of-field image based on the predicted large depth-of-field image such that the predicted shallow depth-of-field image has a focal distance corresponding to the particular image of the plurality of images includes using a differentiable aperture rendering function.

In some embodiments, obtaining the plurality of images of the scene includes operating a camera to capture, using respective different focal distance settings, each image of the plurality of images of the scene.

VI. CONCLUSION

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

While example embodiments throughout have included the use of ANNs to generate depth maps based on input images, it is anticipated that alternative algorithms could be applied to generate depth maps based on images. For example, kernel methods, Bayesian inferential algorithms, reinforcement learning algorithms, cellular automata, decision trees, boosted decision trees, or other alternative algorithms and/or combinations thereof could be applied, according to the methods described herein, to generate depth maps based on input images. Correspondingly, the methods described herein for training ANNs could be applied to train such alternative algorithms, e.g., by providing error information (e.g., difference images between predicted shallow-depth-of-field images and captured or otherwise-acquired "ground truth" shallow-depth-of-field images) that can be applied to update such alternative algorithms (e.g., using backpropagation, reinforcement learning, or some other technique appropriate for the chosen alternative algorithm).

We claim:
1. A method comprising:
   obtaining a plurality of images, wherein a set of at least two images of the plurality of images describe a common scene, wherein the set of at least two images comprises a source image having a first depth-of-field and a target image having a second depth-of-field, wherein the second depth-of-field is less than the first depth-of-field;
   determining, using an artificial neural network, a depth map for the common scene based on the source image;
   determining, based on the determined depth map for the common scene, a predicted image based on the source image such that the predicted image has a depth-of-field corresponding to the second depth-of-field;
   determining a difference between the predicted image and the target image;
   updating the artificial neural network based on the determined difference;
   obtaining an image of a scene of interest; and
   using the updated artificial neural network to generate a depth map for the scene of interest based on the image of the scene of interest.
2. The method of claim 1, wherein determining, based on the first depth map, a predicted image based on the source image comprises using a differentiable aperture rendering function.
3. The method of claim 2, wherein the using the differentiable aperture rendering function to determine the predicted image comprises:

determining an estimated light field based on the source image; and based on the first depth map, shearing and projecting the estimated light field to determine the predicted image.

4. The method of claim 1, wherein determining, using the artificial neural network, the depth map for the common scene based on the source image comprises:

determining, using the artificial neural network, a set of depth values based on the source image, wherein each depth value of the set of depth values corresponds to a respective location within the source image; and upsampling the set of depth values to generate the depth map for the common scene.

5. The method of claim 4, wherein upsampling the set of depth values to generate the depth map for the common scene comprises using a bilateral method to upsample the set of depth values based on the source image.

6. The method of claim 1, wherein the target image is a first target image, wherein the predicted image is a first predicted image, wherein the determined difference is a first determined difference, wherein the set of at least two images further comprises a second target image having a third depth-of-field, wherein the third depth-of-field differs from the second depth-of-field and is less than the first depth-of-field, the method further comprising:

determining, based on the determined depth map for the common scene, a second predicted image based on the source image such that the second predicted image has a depth-of-field corresponding to the third depth-of-field; and determining a second difference between the second predicted image and the second target image, wherein updating the artificial neural network comprises updating the neural network based on the second difference.

7. The method of claim 1, wherein obtaining the set of at least two images that describe the common scene comprises:

capturing, using a light field camera, a light field from the common scene;

generating the source image based on the captured light field such that the source image has the first depth-of-field; and generating the target image based on the captured light field such that the target image has the second depth-of-field.

8. The method of claim 1, wherein obtaining the set of at least two images that describe the common scene comprises:

capturing, using a camera set to a first aperture setting, the source image; and capturing, using the camera set to a second aperture setting, the target image, wherein the second aperture setting is wider than the first aperture setting.

9. The method of claim 1, wherein obtaining the image of the scene of interest comprises operating a cell phone to capture the image of the scene of interest, the method further comprising:

transmitting, from a server to the cell phone, an indication of the updated artificial neural network, wherein using the updated artificial neural network to generate the depth map for the scene of interest based on the image of the scene of interest comprises a processor of the cell phone using the updated artificial neural network to generate the depth map for the scene of interest.

10. The method of claim 1, further comprising:

performing image processing on the image of the scene of interest based on the determined depth map for the scene of interest.

11. The method of claim 1, wherein the artificial neural network is a convolutional neural network.

12. A method comprising:

obtaining, by a system, a plurality of images, wherein a set of at least two images of the plurality of images describe a common scene, wherein the set of at least two images comprises a source image having a first depth-of-field and a target image having a second depth-of-field, wherein the second depth-of-field is less than the first depth-of-field;

determining, by the system using an artificial neural network, a depth map for the common scene based on the source image;

determining, by the system based on the determined depth map for the common scene, a predicted image based on the source image such that the predicted image has a depth-of-field corresponding to the second depth-of-field;

determining, by the system, a difference between the predicted image and the target image;

updating, by the system, the artificial neural network based on the determined difference; and transmitting, from the system to a remote device, an indication of the updated artificial neural network.

13. The method of claim 12, wherein determining, based on the first depth map, a predicted image based on the source image comprises using a differentiable aperture rendering function.

14. The method of claim 13, wherein the using the differentiable aperture rendering function to determine the predicted image comprises:

determining an estimated light field based on the source image; and based on the first depth map, shearing and projecting the estimated light field to determine the predicted image.

15. The method of claim 12, wherein the target image is a first target image, wherein the predicted image is a first predicted image, wherein the determined difference is a first determined difference, wherein the set of at least two images further comprises a second target image having a third depth-of-field, wherein the third depth-of-field differs from the second depth-of-field and is less than the first depth-of-field, the method further comprising:

determining, based on the determined depth map for the common scene, a second predicted image based on the source image such that the second predicted image has a depth-of-field corresponding to the third depth-of-field; and determining a second difference between the second predicted image and the second target image, wherein updating the artificial neural network comprises updating the neural network based on the second difference.

16. The method of claim 12, wherein the artificial neural network is a convolutional neural network.

17. A method comprising:

obtaining a plurality of images of a scene, wherein the images each have a shallow depth-of-field and differ with respect to focal distance;

determining, using an artificial neural network, a depth map for the scene based on the plurality of images;

determining, based on the plurality of images and the determined depth map for the scene, a predicted large depth-of-field image of the scene;

determining, based on the determined depth map for the common scene, a predicted shallow depth-of-field image based on the predicted large depth-of-field image such that the predicted shallow depth-of-field image has a focal distance corresponding to a particular image of the plurality of images;

determining a difference between the predicted shallow depth-of-field image and the particular image;

updating the artificial neural network based on the determined difference; and using the updated artificial neural network to determine an updated depth map for the scene based on the plurality of images.

18. The method of claim 17, wherein the artificial neural network is an autoencoder convolutional neural network.

19. The method of claim 17, wherein determining, based on the determined depth map for the common scene, a predicted shallow depth-of-field image based on the predicted large depth-of-field image such that the predicted shallow depth-of-field image has a focal distance corresponding to the particular image of the plurality of images comprises using a differentiable aperture rendering function.

20. The method of claim 17, wherein obtaining the plurality of images of the scene comprises operating a camera to capture, using respective different focal distance settings, each image of the plurality of images of the scene.

* * * * *